(No Model.)
F. A. WELLES & T. H. HARRISON.
BEAM COMPASSES.
No. 428,191. Patented May 20, 1890.
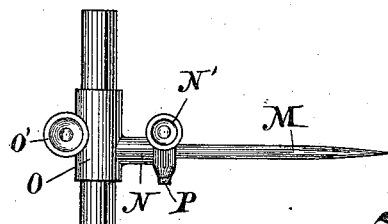
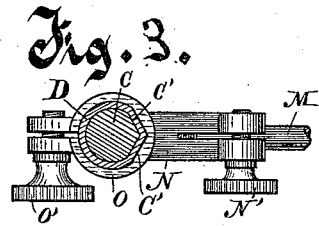
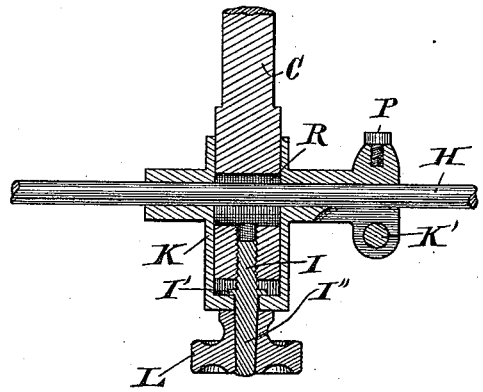
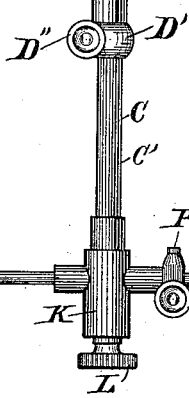
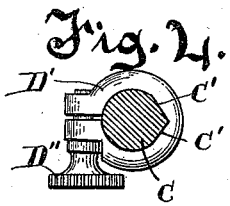
Witnesses.
Inventors.
Fred A. Welles.
Thomas H. Harrison.
By Ernst Benedict
Attorneys.

UNITED STATES PATENT OFFICE.

FRED A. WELLES AND THOMAS H. HARRISON, OF MILWAUKEE, WISCONSIN.

BEAM-COMPASS.

SPECIFICATION forming part of Letters Patent No. 428,191, dated May 20, 1890.

Application filed June 5, 1889. Serial No. 313,195. (No model.)

*To all whom it may concern:*

Be it known that we, FRED A. WELLES and THOMAS H. HARRISON, of Milwaukee, in the county of Milwaukee and State of Wisconsin, have invented a new and useful Trammel or Beam-Compass; and we do hereby declare the following to be a full, clear, and exact description of said invention, reference being had to the accompanying drawings, and to the letters of reference marked thereon, which form a part of this specification.

In the drawings, Figure 1 is a view of the complete device. Fig. 2 is a central longitudinal section of that part of the device shown at the lower end of Fig. 1. Fig. 3 is an end view of that part of the device shown at the upper end of Fig. 1, the rod and surrounding parts being in cross-section. Fig. 4 is a transverse section of the rod and a view of the clamping device at the end of the extension-tube.

A metal rod C is provided with an extension-tube D, which is fitted to and slides upon the rod C, and is adapted to extend the length of the tool. The rod C has one or more flat faces C' C' longitudinally thereof, and the extension-tube D has corresponding faces fitted to the faces C' C', whereby the extension-tube is held against rotary motion on the rod. At its inner end the extension-tube D is provided with a split clamp D', rigid to the tube, which clamp is adapted to be closed tightly on the rod C by means of a thumb-screw D", turning through the two parts of the clamp. A bracket K, provided with a socket into which the end of the rod C is received, is held adjustably to the rod by the screw-threaded bolt I turning into the end of the rod. This bolt I is provided with a collar I', which bears on the inner end wall of the socket in the bracket K, and has a tapering shank I", which passes through an aperture in the end wall of the socket, and is provided with a milled head L, having a central aperture, whereby the head is fitted snugly but removably on the tapering shank I". This bolt I is adapted to establish a nice adjustment of the rod C in bracket K after the pointer has been adjusted approximately by moving the sleeve O along on the tube D or by moving the tube D on the rod C, or both. A pointer H is inserted through the bracket K transversely in an aperture therefor, and is adjustably clamped therein by a thumb-screw K', turning through split parts of the bracket, whereby the parts are made to grasp the pointer firmly. A slot R is provided in the rod C for the passage of the pointer H therethrough and to permit of the adjustment of the rod C endwise in the bracket K. The pointer H at one end terminates preferably in a bent point H', and is otherwise straight, terminating at the other end in a sharp point H". A second pointer M is inserted in a split lug N, integral with and forming a part of a split sleeve O, fitted and sliding on the tube D. The parts of the split lug N are clamped upon the pointer M by means of a thumb-screw N', and the parts of the split sleeve O are clamped on the tube D by a thumb-screw O'. This form of device is adapted for use as a trammel on level surfaces or on surfaces having different elevations, and to adapt the device for use as calipers for outside measurements steel faces P P are provided opposite each other on the bracket K and lug N, respectively. These faces P P are conveniently formed by diminutive bolts or pins inserted in the bracket and lug, respectively, in the manner shown in Figs. 1 and 2.

What we claim as new, and desire to secure by Letters Patent, is—

1. In a trammel, the combination, with the rod C, of a bracket K, fitted and movable endwise on the rod at its end, a pointer H, passing transversely through the bracket K and rod C and supported and adjustable endwise in the bracket, and a bolt I, provided with a head L, the bolt having bearings in the bracket and turning by a screw-thread in the end of the rod, whereby the bracket is adjustable on the rod, substantially as described.

2. In a trammel, the combination, with a rod C, provided with a slot R, of a bracket K, fitted and movable on the rod, a pointer H, supported and adjustable transversely in the bracket through the slot R, and a bolt I, having bearings in the end of the bracket and turning by a screw-thread into the end of the rod, whereby the bracket is adjustable on the rod endwise, substantially as described.

3. The combination, in a trammel, of a rod C, a thereon sliding extension-tube D, a bracket K, secured adjustably to the rod C and provided with an adjustable pointer H, a sleeve O, adjustable on tube D and provided with a pointer M, secured adjustably thereto, substantially as described.

4. The combination, with a rod C, a bracket K, adjustable on rod C endwise, and a face P on bracket K, which face is at right angles to the axis of the rod C, of an extension-tube D, sliding and adjustable on the rod C, a sleeve O, sliding and adjustable on the tube D, and a face P on a bracket on the sleeve O, the latter face P being also at right angles to the axis of the rod C and opposite to face P on bracket K, the rod C, tube D, bracket K, and sleeve O being each provided with a face fitted to each other, respectively, whereby they are held against any rotary movement on each other, substantially as described.

In testimony whereof we affix our signatures in presence of two witnesses.

FRED A. WELLES.
THOMAS H. HARRISON.

Witnesses:
C. T. BENEDICT,
ANNA FAUST.